United States Patent Office 3,184,062
Patented May 18, 1965

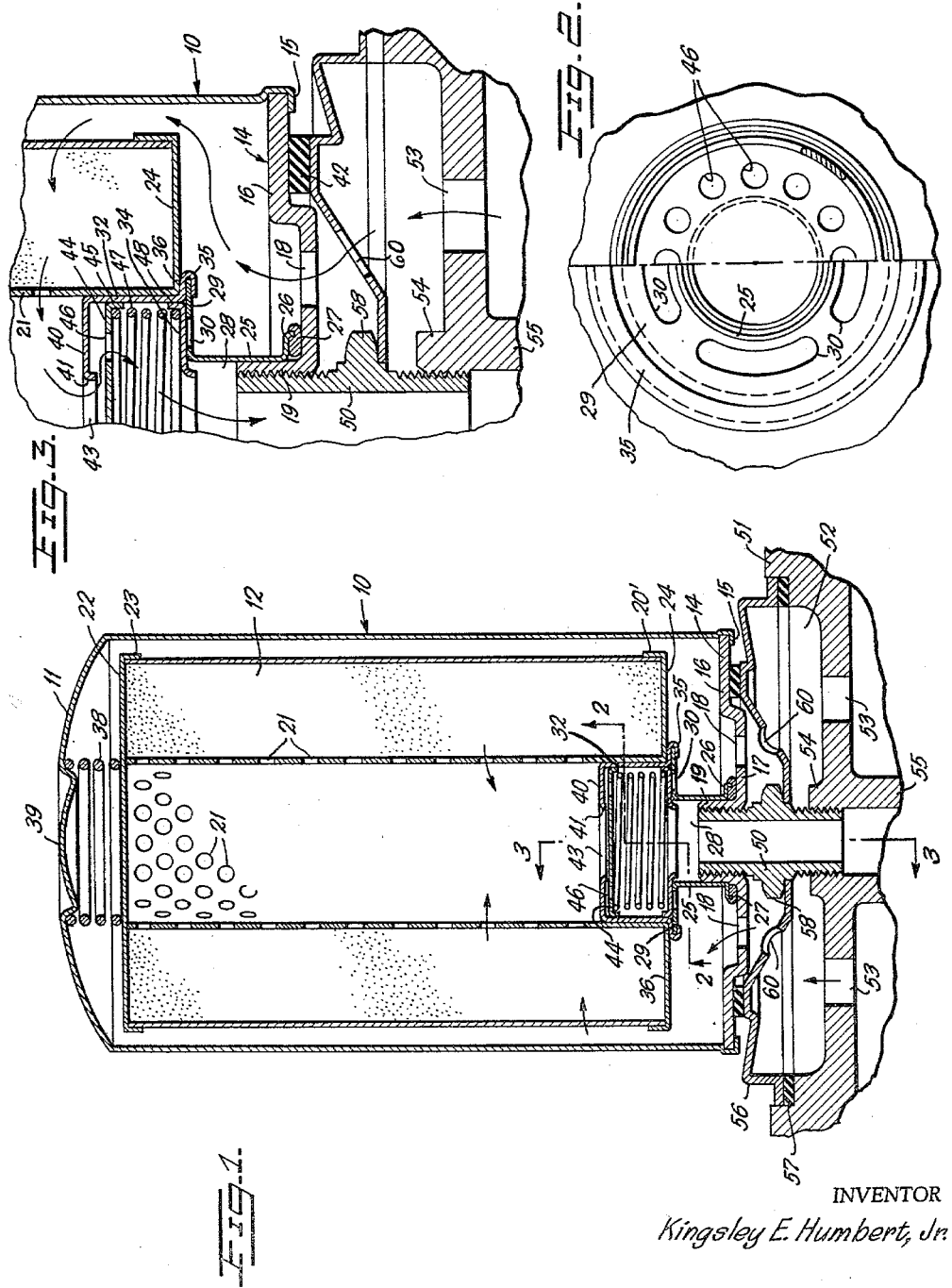

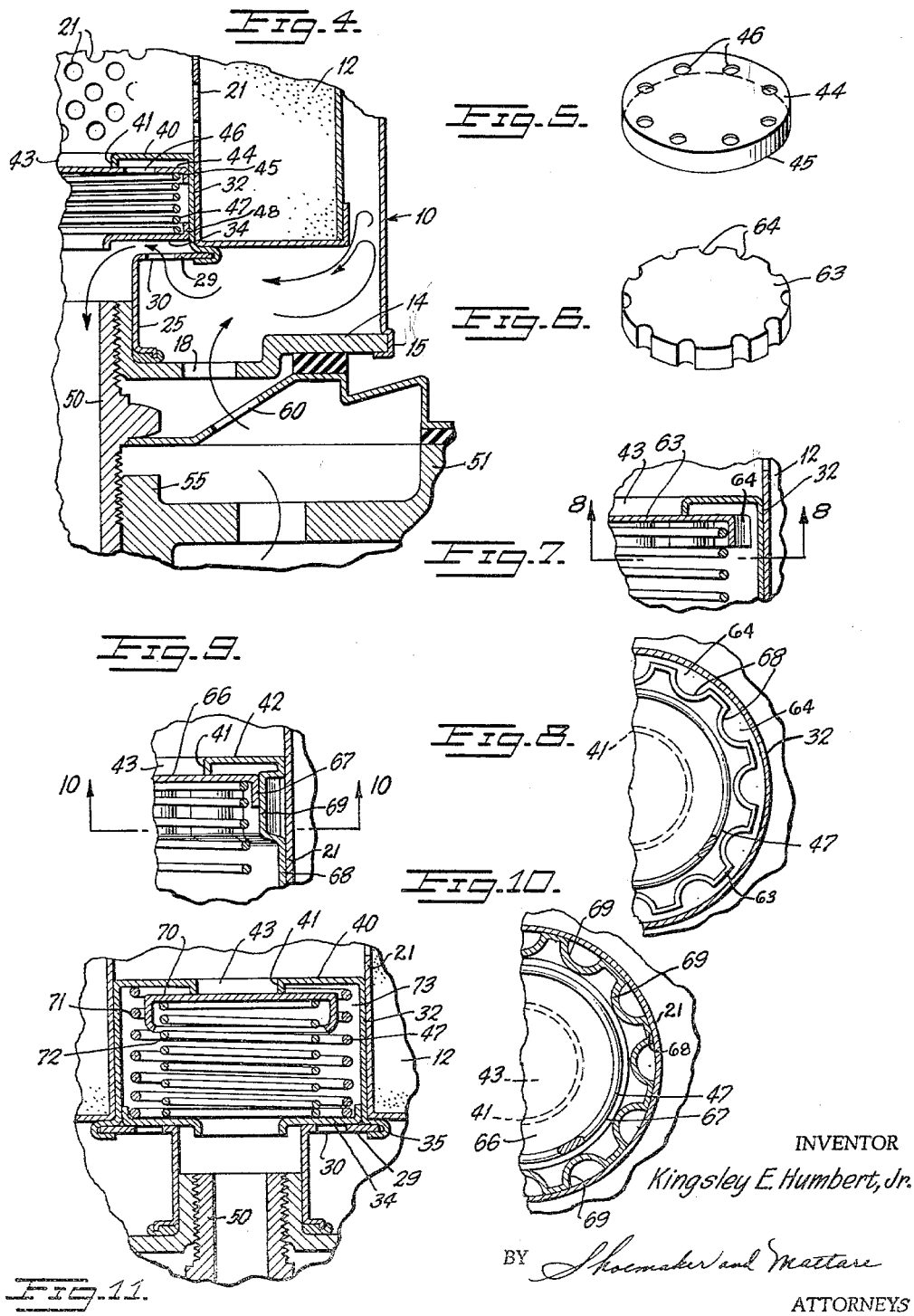

3,184,062
FILTER UNIT
Kingsley E. Humbert, Jr., Gastonia, N.C., assignor to Wix Corporation, Gastonia, N.C., a corporation of North Carolina
Filed Feb. 27, 1962, Ser. No. 175,930
5 Claims. (Cl. 210—130)

The present invention relates to a filter unit, and more particularly to a filter unit provided with an anti-drain back valve and a by-pass valve.

In accordance with the present invention, an oil filter unit is provided adapted to be threaded onto an internal combustion engine for filtering the lubricating oil therein flowed to the engine parts. It is a type of oil filter that receives the total flow of the oil from the engine oil pump and filters the dirt and contaminants from the oil, after which the oil is discharged to the engine oil galleries and the other engine parts. It generally is known as a full-flow oil filter in that the complete flow of oil is circulated therethrough, as distinguished from a part flow oil filter in which only a part of the oil at a time is filtered therethrough, the remaining portion or part of the oil by passing the filter.

Such a full-flow oil filter generally comprises a filter cartridge permanently sealed within a casing and the casing is provided with means for screwing the oil filter casing in an oil tight relationship directly upon the engine block of an internal combustion engine. In such an oil filter, it is necessary to provide it with some means to by-pass the filter cartridge should the cartridge become so contaminated as to restrict the flow of the required amount of oil to the engine parts for proper lubrication. This type of filter unit also requires an anti-drain back or one-way valve in order to prevent oil from the engine parts from leaking back through the filter casing to the oil reservoir or crank case when the engine is shut down so that upon again starting the engine, it will not be starved of oil.

It is an object of the present invention to provide a full-flow type spin-on oil filter for directly mounting it upon the engine block of an internal combustion engine that is provided with parallel oil flow paths through the oil filter casing in which the anti-drain back valve is disposed in one flow path of oil flow, and the by-pass valve is disposed in another path of flow with respect to the inlet to the oil filter casing.

It is another object of the present invention to provide a full-flow oil filter for an internal combustion engine and the like having inlet means therein and an anti-drain back valve and a by-pass valve disposed therein in parallel relationship with one another so that the oil entering the oil inlet means will normally open the anti-drain back valve during normal operation of the oil filter cartridge therein, while the by-pass valve remains closed when the pressure of the oil flowing through the oil inlet means is below a predetermined value, and which will operate so that the anti-drain back valve is closed and the by-pass valve is opened when the oil flowing through the oil inlet means exceeds a predetermined value.

It is another object of the present invention to provide a full-flow, screw-on type oil filter cartridge having an anti-drain back valve and by-pass valve permanently sealed in the oil filter casing, in which the anti-drain back valve and the by-pass valve provide two separate and independent flow paths for the oil passing therethrough, and in which one valve or the other valve is closed, while the other valve is in an open position permitting the flow of oil therethrough, and in which the unseating of either of the valves is determined by the pressure of oil flowing therethrough and acting against the upstream areas of the respective valve disc means.

It is another object of the present invention to provide a full-flow screw-on type oil filter having separate flow paths disposed in parallel relationship with each other and comprising an anti-drain back valve, and a by-pass or relief valve, which valves are normally urged toward a seated or closed position by a common or single biasing means.

It is another object of the present invention to provide a spin-on full-flow type oil filter having an anti-drain back valve and a by-pass valve therein in which the oil being flowed through the inlet means of the filter will follow a first path of flow through the filter casing and unseat the anti-drain back valve when the oil pressure is below a predetermined value, and in which the oil flowing through the oil inlet means will follow another path of flow and unseat the by-pass valve when the oil flowing through the inlet means is above a predetermined pressure, and in which both valves are disposed in a parallel flow relationship with respect to the oil inlet means.

It is another object of the present invention to provide a spin-on full-flow oil filter having an anti-drain back valve that is disposed within the filter cartridge and in spaced relationship with the oil inlet means.

It is another object of the present invention to provide an oil filter having an anti-drain back valve disposed on the downstream side of the oil filter cartridge and within the oil filter casing or housing.

It is another object of the present invention to provide spin-on type full-flow oil filter having a casing in which is permanently sealed an anti-drain back valve and a by-pass valve and a filter cartridge in which the entire assembly is thrown away or discarded when the filter becomes contaminated and in which the anti-drain back valve and the by-pass valve are both disposed within the center tube means of the filter cartridge.

It is another object of the present invention to provide an anti-drain back valve means and by-pass valve means disposed within the center tube of a filter cartridge permanently sealed within an oil filter casing, that is directly mounted onto the engine block of an internal combustion engine or the like, and in which the areas of the upstream sides of the valves are predetermined so that the differential pressure at which the by-pass valve opens can be set at a predetermined value above the opening of the anti-drain back valve.

The present invention further provides an anti-drain back valve having a novel serrated or scalloped portion thereon for permitting flow of the oil around the valve.

The present invention further provides a novel anti-drain back valve having fluted or ribbed sleeve means disposed around the anti-drain back valve disc for permitting the flow of oil therethrough when the valve is in an open position.

Various other objects and advantages of the present invention will be readily apparent from the following detailed description when considered in connection with the accompanying drawings forming a part thereof, and in which:

FIG. 1 is a vertical sectional view of an oil filter unit mounted on an engine block of an internal combustion engine embodying the present invention and illustrating the anti-drain back valve and the by-pass valve in closed positions;

FIG. 2 is a section taken along lines 2—2 of FIG. 1;

FIG. 3 is an enlarged fragmentary section taken on lines 3—3 of FIG. 1, illustrating the anti-drain back valve in an open position;

FIG. 4 is a view similar to FIG. 3 illustrating the anti-drain back valve in a closed position, and the by-pass valve in an open position when the filter is clogged;

FIG. 5 is a perspective detail view of the anti-drain back valve disc disposed in the embodiment of the invention shown in FIGS. 1 to 4;

FIG. 6 is a perspective view of a modification of the anti-drain back valve disc shown in FIG. 5;

FIG. 7 is a fragmentary detailed view illustrating the anti-drain back valve disc of FIG. 6 shown in a closed position and disposed in the valve assembly;

FIG. 8 is a section taken along lines 8—8 of FIG. 7 illustrating the serrated anti-drain back valve disc shown in FIG. 6;

FIG. 9 is a fragmentary detailed view of another modification of the invention showing another type anti-drain back valve disposed within a fluted or ribbed sleeve member;

FIG. 10 is a fragmentary view taken along lines 10—10 of FIG. 9, further illustrating the fluted sleeve means surrounding the anti-drain back valve disc shown in FIG. 9; and FIG. 11 is a fragmentary detailed view of still another embodiment of the anti-drain back valve and by-pass valve means of the present invention, in which there are two separate biasing means urging the respective valves into a seated or closed position.

Referring to the drawings, the reference numeral 10 generally designates a cylindrical oil filter casing or housing having a dome-shaped upper closed end 11 in which is disposed an annular filter cartridge 12. The bottom of the cylindrical casing 10 is closed off by a circular plate or closure member 14 secured to the lower end of the casing 10 by rolling over the lip 15 on the lower end of the casing 10 and brazing or welding the lip to the outer surface of plate 14 to provide an oil-tight seal therebetween.

The closure plate 14 has an annular peripheral portion 16 with a downwardly extending or offset portion 17 disposed inwardly thereof and provided with a plurality of circumferentially spaced oil inlet openings or ports 18. The inner end of the offset portion 17 terminates in an upwardly extending internally threaded boss, nipple or bushing 19.

The filter cartridge 12 may consist of a well known resin impregnated pleated paper element, or a depth type filter mass provided with a perforated central member or center tube 21 coextensive with the longitudinal axis of the annular filter 12. The upper end of the filter 12 is sealed off by a solid circular disc member 22 having a downwardly turned rim or flange 23 secured to the outer periphery of the element 12. The lower end of the filter element is sealed off by a lower annular end cap 24 having an upturned rim 20'. The end cap 24 and its rim are generally secured to the bottom of the filter element 12 by cement or other suitable means and the center tube 21 is connected to the central part of the end cap.

The filter cartridge 12 is seated on a cylindrical filter support member 25. Filter support member 25 comprises a sleeve having an inside diameter slightly larger than the outside diameter of the bushing 19 so that the lower portion of the sleeve may be readily disposed or mounted over the bushing 19, as clearly shown in FIGS. 1 and 3. The lower end of the sleeve 25 terminates in an outwardly and downwardly extending flange or lip 26 secured to a resilient elastomer ring gasket 27. The gasket 27 may be cemented to the lip 26 or the lip, if desired, may be embedded into the gasket so that the two parts are secured to each other in an oil tight relationship. The gasket 27 is adapted to be compressed against the inner surface of the offset portion 17 of the closure member 14 and against the outer lower surface of bushing 19 so as to provide a seal therefor. The sleeve 25 extends a substantial distance above the top of the bushing 19 so as to provide a central discharge chamber 28 thereabove. The upper end of the sleeve 25 extends outwardly to form a horizontal annular flange member 29 provided with spaced arcuate slots 30 therein as best seen in FIG. 2, which define oil by-pass ports for the by-pass valve means, as hereinafter described.

The outer end of the flange member 29 has an enlarged cylindrical casing or vertical sleeve member 32 secured thereto. The sleeve 32 is provided for mounting an anti-drain back valve disc 44 and the by-pass valve disc 34 therein. The lower end of a valve sleeve 32 is provided with a rolled bead 35 to secure the valve sleeve to the filter support sleeve 25 in an oil tight relationship, as best illustrated in FIG. 3.

The filter center tube 21 has an inside diameter slightly larger than the outside diameter of the valve sleeve 32 so that it may be mounted on the valve sleeve so that the lower inner end portion 36 of the filter end cap 24 seats on the upper surface of the bead 35 in an oil tight relationship. Preferably, the end cap is made of a resilient material so that it may be slightly compressed to provide a good seal. The end cap may be made of paper or plastic material, such as polyvinyl material or, if desired, a separate gasket can be seated on the bead 35 if the end cap 24 is made of metal material.

The filter element 12 is maintained in a seated oil tight relationship on and with the bead 35 by a spring member 38 disposed on the upper end cap 22 and seated in an annular channel formed by the indentation or recess 39 formed in the closed end 11 of the cylindrical oil filter casing.

The upper end of the valve sleeve 32 is provided with an inwardly extending annular rim or flange 40 having a downwardly extending lip 41 to provide a central oil or discharge opening 43 therein. The flange 40 extends substantially inwardly of the filter support sleeve 25.

The anti-drain back valve member or disc 44 is disposed within the valve sleeve 32 and is provided with a downwardly extending peripheral lip 45 thereon. The valve disc 44 is slidable within the valve sleeve casing 32 and has its lip 45 in slidable engagement with the inner surface of the valve casing. The valve disc 44 is provided with a plurality of circumferentially spaced apertures or openings 46 therein, which openings are disposed in the valve disc outwardly of the central lip 41 below flange 40 so that when the valve disc 44 is seated in contact with and abuts the lip 41, the central opening 43 is closed. A spring member 47 is mounted within valve sleeve casing 32 and has its upper end disposed within and adjacent the lip 45 of the anti-drain back valve disc so as to normally urge the valve disc to seated position against lip 41.

The by-pass or relief valve disc 34 is provided with a peripheral lip 48 adjacent its outer end and has the lower end of spring 47 mounted therein to normally urge the by-pass valve disc 34 to a seated position against horizontal flange member 29 covering the by-pass oil ports 30. The annular by-pass valve disc 34 is mounted within the valve sleeve or casing 32 so that the upwardly turned peripheral lip 48 slidably engages the inner surface of the valve sleeve. Spring member 47 has its lower end disposed within and adjacent lip 48.

The oil filter unit is secured directly to the adaptor bushing 50 of an engine block 51 by threading the boss 19 onto the upper end of the externally threaded adaptor member or bushing 50. The engine block 51 is provided with an annular recess 52 therein having a plurality of spaced oil supply ports 53 in the bottom thereof in communication with the oil pump of an engine, not shown, to supply oil to be filtered to the inlet openings 18 of the oil filter unit.

The adaptor bushing 50 is threaded into a central boss 54 disposed in the bottom of the recess 52, which boss communicates with the engine oil galleries, not shown, through a central discharge tube 55. A circular adaptor plate 56 is disposed on a resilient elastomer ring gasket 57 positioned on an annular shoulder in the engine block around recess 52. The adaptor plate 56 is provided with a central opening therein and is secured on the engine block by the hollow adaptor bushing 50 which is provided with a hexagonal head or flange 58 thereon. The lower end of the externally threaded adaptor bushing 50 is threaded into the top of the central tube 54 so that the head 58 abuts the portion of plate 56 around the central opening therein to properly secure it to the engine block. Oil is prevented from leaking between adaptor plate 56 and closure plate 14 of the filter casing by an elastomer ring gasket 42 cemented to the bottom of plate 14. The plate 56 is provided with a plurality of circumferentially spaced oil inlet ports 60 in communication with the oil ports 53 and the oil inlet ports 18 in the oil filter.

In operation, when the oil filter has been properly secured onto the engine block 51 and the internal combustion engine is started, the oil pump of the engine, not shown, supplies oil through oil inlet ports 53 to recess 52, the oil thereafter flowing through oil ports 60 and the oil inlet ports 18 in the bottom plate 14 into the oil filter casing. The oil then passes therethrough as indicated by the arrows in FIG. 2 flowing around the outside of the filter element 12 and radially inwardly therein into center tube 21. The oil in passing through the filter element has any dirt or contaminants therein removed therefrom. The oil thereafter flows downwardly in the center tube, the oil pressure acting against the upper surface of the anti-drain back valve disc 44 and causing the valve to unseat from lip 41 so that the oil may pass through the openings 46 in the valve disc. Thereafter, the oil flows out as indicated through the openings 46 in the disc 44 flowing through the interior of the valve casing 32 and into the adaptor bushing 50. The oil thereafter flows through the center discharge tube 55 to the engine oil galleries for lubricating the necessary parts of the engine.

At this time, the by-pass valve disc 34 is seated on flange 29 and closes off the oil by-pass ports 30 so that the oil will not by pass the filter element 12. Although the oil entering oil inlet ports 18 has two selective parallel paths of flow; namely, a path through the oil filter element 12 wherein the oil will be filtered, or another flow path directly from the oil inlet openings 18 through the by-pass ports 30 to the interior of the adaptor bushing 50, the operating pressure of the oil will determine which of the two valve discs will be unseated or opened to permit flow of the oil therethrough. Since the area of anti-drain back valve disc 44 which covers or underlies the opening 43 defined by the lip 41 is much larger than the area of the portion or surface of the by-pass valve disc 34 disposed over the oil by-pass ports 30, there will be less pressure required to unseat the valve disc 44. This is because the force of the oil acting against this valve disc 44 is equal to the product of the oil pressure and the area against which it acts, and since the area of 44 is much greater than the area of the by-pass valve disc 34 covering the slots 30, it follows that the anti-drain back valve will be opened at a much lower oil pressure than the by-pass valve 34. Thus, the biasing spring 47 which normally urges both of the valves in a seated or closed position will permit the anti-drain back valve disc 44 to unseat, while the biasing means will maintain the by-pass valve disc 34 seated when the pressure is below a predetermined value. The anti-drain back valve disc is preferably made to unseat when the differential pressure across is from one-half to one p.s.i., while the by-pass valve disc 34 is preferably adapted to unseat when the differential pressure across it is in the range of four to fifteen p.s.i.

When the filter element 12 becomes sufficiently clogged with contaminants so that the oil pressure entering the oil inlet ports 18 of the casing 10 exceeds a predetermined pressure because of the restricted flow through the filter, the oil pressure will then cause the by-pass valve disc 34 to be unseated and open as shown in FIG. 4. At this time although the area of the by-pass valve disc 34 against which the oil acts remains the same, the force acting against the valve is much greater because of the rise or increase in the oil pressure due to the clogged filter, and since the force acting to unseat the by-pass valve disc 34 is equal to the product of the oil pressure and the area against which it acts, the substantial increase in the oil pressure will now cause this valve to unseat.

At this time, the oil will then flow through the oil inlet ports 18 into the oil filter casing 10 as shown in FIG. 4, and the oil will pass through the by-pass ports 30 directly into the interior of the valve casing member 32 and will pass into the adaptor bushing 50 to flow through the center tube 55 to the oil galleries, thus short circuiting the filter element and preventing the engine from being starved of engine oil in spite of the fact that the oil filter element 12 is clogged.

Thus, the present invention provides a novel oil filter having an anti-drain back valve and a by-pass valve disposed therein in parallel relationship with one another with respect to the oil flowing into the oil inlet of the oil filter casing and with a common biasing means normally urging both valves in a seated position, so that the anti-drain back valve will open when the oil pressure is below a predetermined value, while the by-pass valve remains closed, and which further permits the by-pass valve to open and the oil to by pass the filter element when the oil pressure of the oil flowing into the oil filter increases above a predetermined value due to a clogged filter.

When the internal combustion engine is turned off or placed out of operation, the anti-drain back valve will prevent any oil from flowing out of the engine oil galleries through central tube 55 and the adaptor bushing 50 back through the oil filter, to thus prevent the oil from being discharged back into the engine crank case or oil reservoir to starve the engine of oil upon again starting the engine in operation.

The embodiment of the invention shown in FIGS. 6 to 8 is substantially the same as that described in FIGS. 1 to 4, except that the anti-drain back valve disc 63 is provided with a plurality of spaced circumferential grooves, serrations 64 or slots therein instead of the openings 46 in the valve disc in the embodiment of the invention of FIG. 1.

Referring to FIG. 7, it can be seen that oil flowing into the opening 43 will unseat or open the valve disc 63 and will thereafter flow radially outwardly along the upper side of the valve disc 63 and pass through the slots 64 downwardly into the valve casing 32 and into the interior of the adaptor bushing 50. Thus, it is apparent that the operation of this embodiment of the invention is substantially the same as that described for the invention shown in FIG. 1, except that the slots 64 serve as apertures for passing the oil around the anti-drain back valve disc.

The embodiment of the invention shown in FIGS. 9 and 10 is substantially the same as that shown in FIGS. 1 and 6, except that the anti-drain back valve disc 66 is a circular disc having a downwardly turned peripheral flange 67 with no oil ports or apertures therethrough. Instead, the valve casing 68, similar to the valve casing 32, is provided with a plurality of longitudinally extending ribs 69 in the upper portion thereof below the horizontal portion 42. The flange 67 is disposed for slidable engagement with the inner surface of the ribs 69 and the spaced channels defined between the ribs 69 provide passages for flowing the oil around the anti-drain back valve to the interior of the valve casing 68 and the adaptor bushing 50 when the anti-drain back valve 66 is unseated from the lip 41 surrounding the central opening 43.

The modification of the invention shown in FIG. 11 is substantially the same as that shown and described in FIG. 1, except that the anti-drain back valve disc 70 has no oil inlet openings or apertures therethrough but comprises a circular disc having a downwardly turned circumferential flange 71 in which is mounted a second biasing spring 72 for maintaining the disc 70 seated over the central opening 43 of the valve casing 32. The first biasing spring 47 is disposed outwardly of the anti-drain back valve disc 70, and its flange 71 as clearly shown in FIG. 11, and only urges the by-pass valve 34 seated against flange 29 to close off the by-pass oil slots 30, while the second biasing spring 72 is utilized only to maintain the anti-drain back valve 70 in a seated position.

When the anti-drain back valve disc 70 is in an open position and out of contact with the rim 41, the oil flowing through the central opening 43 will flow radially outwardly across the upper surface of the disc 70 and thereafter around the annular channel 73 formed between valve disc flange 71 and the inner surface of the valve casing 32 so that the oil will be discharged into the adaptor bushing 50.

In this embodiment of the invention, the by-pass valve biasing spring is much heavier than the anti-drain back valve spring. This embodiment of the invention is most useful where the area of the anti-drain back valve against which the oil pressure acts is not large enough to give the required differential pressure setting desired for the opening of each valve due to a lack of space within the filter element.

Inasmuch as various changes may be made in the form, location and relative arrangement of the several parts without departing from the essential characteristics of the invention, it will be understood that the invention is not to be limited except by the scope of the appended claims.

I claim:

1. A full flow spin-on type oil filter, comprising a cylindrical filter cartridge housing having an end closure provided with an inlet and a central outlet nipple extending into the housing, a unitary self-contained filter cartridge support and valving means comprising a sleeve having an open end receptive of and in fluid tight engagement with said nipple, the sleeve extending from said end closure into the housing and terminating at its other end in a relatively wide flat annular cartridge support flange extending laterally therefrom in one plane, an elongate cylindrical valve casing comprising a cylindrical wall concentric with said sleeve and having one end resting on said flange adjacent to the lateral outer edge of the latter and rigidly and permanently joined thereto, said casing wall having at its other end a relatively wide integral inwardly projecting imperforate annular flange terminating in an inturned annular lip, said lip defining an oil in-flow passage and also forming a valve seat, said cartridge support flange providing a valve seat and having an oil flow opening therethrough leading into said valve casing from an area adjacent said cartridge support flange, a first valve disc element in said casing seated on said support flange and having a central oil port aligned with said outlet nipple, said first valve disc element being imperforate outwardly of said port and covering and closing said oil flow opening when seated on said support flange, a second valve disc element of substantially the dimensions of said first valve disc element, within said casing in aligned spaced relation with said first disc element and providing with the first disc element a space to receive spring means, the second valve disc element seating against the said annular lip to close said in-flow passage, said second valve disc element being imperforate within the area thereof defined by said lip, spring means in the said space in the valve casing between said valve disc elements and engaging both elements and urging both elements to closed position on their respective seats, means located radially outwardly of said annular lip whereby oil may flow into and through the valve casing to and through said central oil port of the first valve disc element and to said sleeve and outlet nipple when said second valve disc element is unseated from the annular lip, a filter cartridge in the housing embodying an annular filter medium having a central passage therein open at one end, said cylindrical valve casing being positioned a substantial distance within said central passage and in engagement with the wall thereof and supported on said wide flat cartridge support flange, and said second valve disc element being on the outlet side of the annular filter medium for oil flowing therethrough and effecting increased tensioning of said spring means on the first disc valve element to maintain the same firmly on its seat by pressure of the flowing filtered oil when the second valve disc element is unseated from the annular lip seat.

2. A full flow spin-on type oil filter as defined by claim 1, wherein the said means located outwardly of said annular lip is provided by spaced inwardly projecting ribs on the valve casing wall and extending longitudinally thereof and against which the periphery of the second valve disc engages and moves, the said second valve disc being imperforate and the spaces between the ribs within the casing being bridged by the said periphery of the disc and forming flow ports.

3. A full flow spin-on type oil filter according to claim 1, wherein the said means located outwardly of said annular lip consists of recesses in and extending across the periphery of said second valve disc and the periphery of said second valve disc lies closely adjacent to the said wall of the valve casing whereby said recesses form oil passing ports.

4. A full flow spin-on type oil filter according to claim 1 wherein the said second valve disc has an encircling downturned peripheral flange lying closely adjacent to said wall of the valve casing and the said means located outwardly of said annular lip consists of spaced recesses in and extending across said flange and disposed around the disc.

5. A full flow spin-on type oil filter according to claim 1, wherein the said means located radially outwardly of said annular lip comprises an annular space between the periphery of said second valve disc and the valve casing wall and said spring means consists of two concentrically disposed coil springs one of which encircles the second valve disc and is interposed between the said inwardly projecting annular flange of the valve casing and the first valve disc and the second spring is interposed between and bears against the opposing surfaces of the two disc elements.

References Cited by the Examiner
UNITED STATES PATENTS

| | | | |
|---|---|---|---|
| 2,431,782 | 12/47 | Walton et al. | 210—133 |
| 2,995,249 | 8/61 | Boewe et al. | 210—136 X |
| 3,036,711 | 5/62 | Wilhelm | 210—130 |
| 3,042,215 | 7/62 | Gruner | 210—130 X |

REUBEN FRIEDMAN, Primary Examiner.

HARRY B. THORNTON, HERBERT L. MARTIN,
*Examiners.*